UNITED STATES PATENT OFFICE.

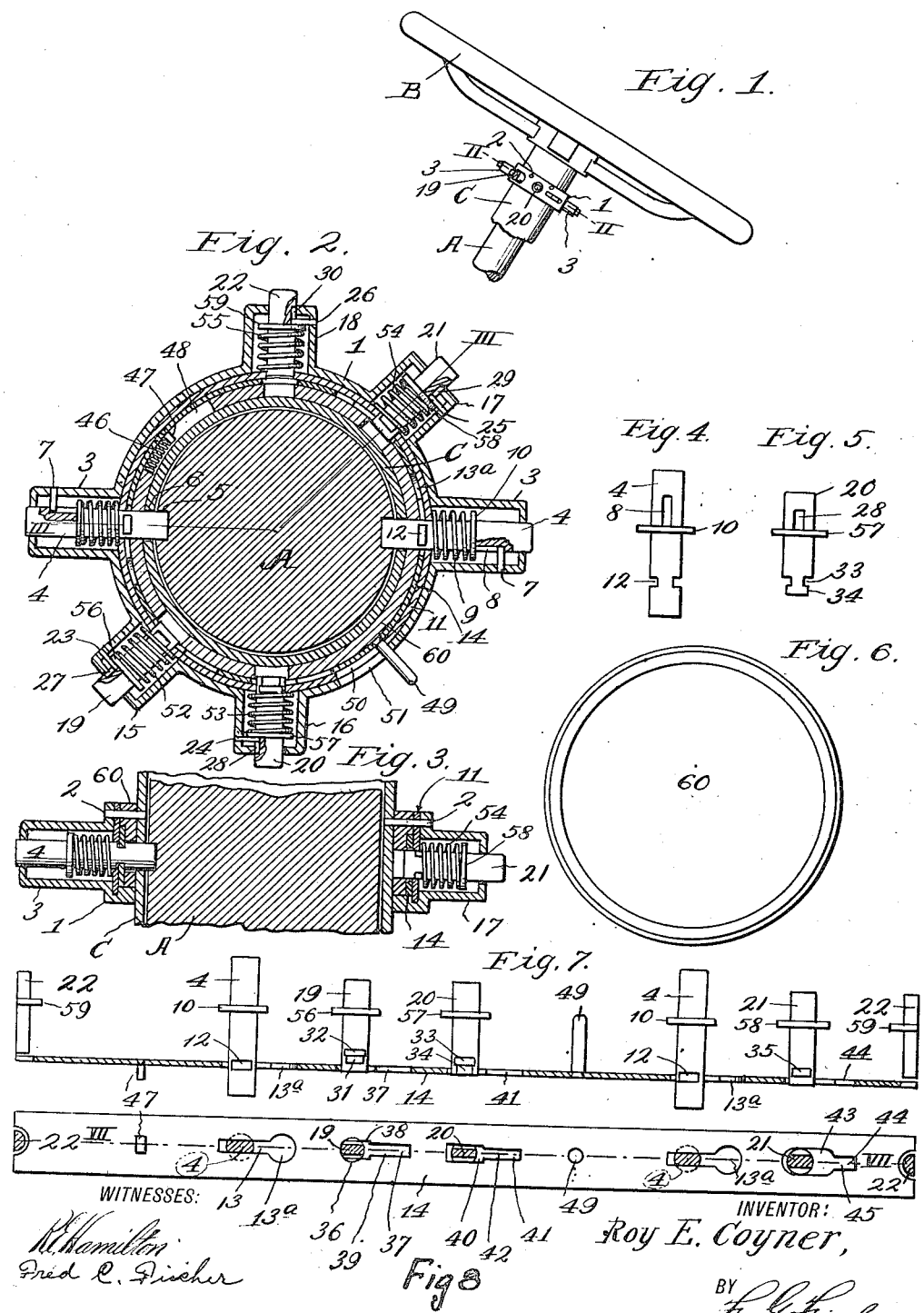

ROY E. COYNER, OF BURR OAK, KANSAS.

COMBINATION-LOCK FOR AUTOMOBILES.

1,137,742.  Specification of Letters Patent.  Patented May 4, 1915.

Application filed November 30, 1914. Serial No. 874,714.

*To all whom it may concern:*

Be it known that I, ROY E. COYNER, a citizen of the United States, residing at Burr Oak, in the county of Jewell and State of Kansas, have invented certain new and useful Improvements in Combination-Locks for Automobiles, of which the following is a specification.

My invention relates to improvements in automobile locks, and my object is to provide a combination lock which can be readily applied to the steering column of an automobile for the purpose of locking the steering rod from rotation, so that an automobile can be safely left upon the street when locked with the front wheels set at an angle, without danger of being stolen during the absence of the owner.

In order that the invention may be fully understood, reference will now be made to the accompanying drawing, in which:

Figure 1 is a broken side elevation showing the steering rod and the column with my combination lock applied to the latter. Fig. 2 is a section, enlarged, on line II—II of Fig. 1. Fig. 3 is an irregular section on line III—III of Fig. 2. Fig. 4 is an elevation of a bolt constituting part of the invention. Fig. 5 is an elevation of a push-button forming part of the invention. Fig. 6 is a plan view of the lock case cap. Fig. 7 is a section on line VII of Fig. 8. Fig. 8 is a diagrammatic view of certain parts of the lock.

A designates the rotatable steering rod, B the steering wheel fixed to the upper end of the rod A, and C the stationary sleeve or column inclosing the steering rod A. The foregoing parts are of ordinary construction.

In carrying out my combination lock constituting the important feature of the present invention, I employ an annular case 1, which may be readily slipped upon the column C after removing the steering wheel B. Case 1 is firmly secured to the column C by any suitable means, such for instance, as pins 2.

3 designates a pair of tubular extensions projecting radially from opposite sides of the case 1, to house a pair of bolts 4, the outer ends of which project from said tubular extensions, while their inner ends are adapted to enter openings 5 and 6 formed in opposite sides of the steering rod A and the column C, respectively, to lock said steering rod from rotation. Longitudinal movement of the bolts 4 in the tubular extensions 3, is limited by any suitable means, such, for instance, as pins 7 and the ends of grooves 8, which latter are formed in the bolts 4, the pins 7 extending inward from the tubular extensions 3, see Fig. 2. The bolts 4 are embraced by coil springs 9, interposed between peripheral shoulders 10, on said bolts, and a stationary band 11 within the case 1. The bolts 4 have oppositely-disposed peripheral notches 12, to receive the edges of the narrow portions 13 of key-hole slots 13$^a$, arranged in a movable band 14.

15, 16, 17 and 18 designate tubular extensions projecting radially from the case 1 and housing push-buttons 19, 20, 21, and 22, respectively, reciprocably mounted in said tubular extensions and the stationary band 11. Movement of the push-buttons is limited by pins 23, 24, 25 and 26, projecting from the tubular extensions 15, 16, 17 and 18, into grooves 27, 28, 29 and 30, extending longitudinally of the push-buttons 19, 20, 21 and 22, respectively. This arrangement also prevents the push-buttons 19 to 21, inclusive, from rotating and getting certain notches therein out of proper relation with key-hole slots, hereinafter referred to, arranged in the movable band 14. It also prevents the push-button 22 from rotating, but as said push-button is only a dummy and does not control the locking or unlocking operations, it is immaterial whether it rotates or not. The notches in the push-button 19 consist of a pair of oppositely-disposed shallow notches 31 and a pair of deep notches 32 (Fig. 7), which latter are arranged immediately above the former. The push-button 20 has two oppositely-disposed peripheral notches 33, which communicate with the two oppositely-disposed flattened sides 34 of the lower portion of said push-button. The push-button 21 has two oppositely-disposed peripheral notches 35. The dummy push-button 22 has no notches and is only intended to increase the difficulty of solving the combination by a person not familiar with said combination. The lower terminal of the push-button 19, extends through the circular portion 36 of a key-hole slot 37, in the movable band 14. Said key-hole slot 37, has a reduced portion 39 to receive the notches 32 on the push-button 19. The flattened sides 34 of the push-button 20, extend through the wide portion 40 of a key-hole slot 41 in the movable band 14, said key-hole slot 41 having a reduced portion 42 to receive the notched portions 33 of said push-button 20. The lower end of the push-button 21, extends through the wide portion 43 of a key-hole slot 44 in the movable band 14, said key-hole slot 44 having a reduced portion 45 to receive the notched portions 35 of the push-button 21.

46 designates a spring to force the band 14 to unlocked position. One end of said spring bears against a lug 47, fixed to the band 14, and the opposite end of said spring 46 bears against one end of a slot 48 in the inner wall of the case 1.

49 designates a handle extending radially from the band 14 through slots 50 and 51 in the stationary band 11 and the outer wall of the case 1, respectively, to move the band 14 to locked position.

52, 53, 54 and 55 designate coil springs tending to force the push-buttons 19, 20, 21 and 22, respectively, outward. Said springs are interposed between the stationary band 11 and peripheral shoulders 56, 57, 58 and 59 on the push-buttons 19, 20, 21 and 22, respectively.

60 designates an annular cap for closing the upper portion of the case 1 after the internal parts of the lock have been properly assembled in said case.

In the drawings the parts are shown in locked position on Figs. 2, 3, 7 and 8. To adjust the parts to unlocked position, the push-button 19 is depressed to force its lower end out of the circular portion 36 and bring its notches 31 in line with the reduced portion 38 of the key-hole slot 37. The band 14 is then automatically advanced one step by the spring 46 to the left, or clockwise, until the rear end of the reduced portion 38 of the slot 37, contacts the adjacent side of the push-button 19, which is held depressed by the sides of the reduced portion 38 entering the notches 31. The push-buttons 19 and 20 are then simultaneously depressed to bring the notches 32 in line with the narrow portion 39 of the slot 37, and the notches 33 in line with the reduced portion 42 of the slot 41, when the band 14 is automatically adjusted another step to the left by the spring 46. The push-button 21 is then depressed to bring its notches 35 in alinement with the reduced portion 44 of slot 45, when the band 14 is automatically adjusted a third and final step to the left by the spring 46. This brings the circular portions of the slots 13ª into register with the bolts 4 which are immediately retracted from the openings 5 in the steering-rod A by the coil springs 9. The steering-rod A is then free to rotate.

In order to lock the steering-rod A, it is only necessary to rotate the same until its openings 5 are in line with the bolts 4, and then move the band 14 to the right or counter-clockwise through the intermediacy of the handle 49, to successively release the push-buttons 22, 20 and 21. As the push-buttons are released, they are automatically pushed outward to lock the band 14, by their springs, causing said band 14 in turn to lock the bolts 4, which have been previously forced in and held by hand against the action of their springs 10, to bring their respective notches 12 in alinement with the narrow portions 13 of the slots 13ª.

From the foregoing description, it is apparent that I have produced a reliable combination lock which is thoroughly effective for the purpose intended, and while I have shown the preferred construction of the lock, it is obvious that changes in the number of push-buttons, and the arrangement of the notches and key-hole slots can be changed to obtain different combinations.

Having thus described my invention, what I claim and desire to secure by Letters Patent, is:

1. In combination with a rotatable member and a fixed sleeve surrounding the same, a case embracing said sleeve, a bolt carried by said case and adapted to secure the rotatable member from rotation, a movable ring to lock said bolt in engagement with the rotatable member and provided with a key-hole slot, and a push-button to lock the movable ring and adapted to in turn be locked by the edge of the key-hole slot.

2. In combination with a rotatable member and a fixed sleeve surrounding the same, a case embracing said sleeve, bolts carried by said case and adapted to secure the rotatable member from rotation, a movable ring to lock said bolts in engagement with the rotatable member and provided with a plurality of irregular shaped slots, a spring tending to move said ring to unlocked position, and push-buttons having different notched portions to coact with the edges of the respective irregular shaped slots to lock the movable ring.

3. In combination with a rotatable member and a fixed sleeve surrounding the same, a case embracing said sleeve, a bolt carried by said case and adapted to secure the rotatable member from rotation, a movable ring to lock said bolt in engagement with the rotatable member and provided with an irregular shaped slot, a handle to move said ring to locked position, a spring to move said ring to unlocked position, a push-button adapted to lock the movable ring and in turn be locked by the edges of the irregular shaped slot, and a spring to control the movement of said push-button in one direction.

In testimony whereof I affix my signature, in the presence of two witnesses.

ROY E. COYNER.

Witnesses:
W. B. HILL,
A. H. CANFIELD.